United States Patent [19]

Verhoog et al.

[11] Patent Number: 6,051,332
[45] Date of Patent: Apr. 18, 2000

[54] VALVE CAP FOR AN ELECTRIC STORAGE CELL

[75] Inventors: Roelof Verhoog, Bordeaux; Alain Genton, Merignac, both of France

[73] Assignee: Alctael, Paris, France

[21] Appl. No.: 09/070,875

[22] Filed: May 1, 1998

[30] Foreign Application Priority Data

May 2, 1997 [FR] France .................................. 97 05455

[51] Int. Cl.⁷ ................................................ H01M 2/12
[52] U.S. Cl. .............................. 429/54; 429/53; 429/57; 429/82
[58] Field of Search ................... 429/53, 54, 55, 429/57, 82, 88, 89

[56] References Cited

U.S. PATENT DOCUMENTS

| | | | |
|---|---|---|---|
| 3,436,273 | 4/1969 | Gratzmuller | 429/54 |
| 4,078,121 | 3/1978 | Gratzmuller | 429/54 |
| 4,431,716 | 2/1984 | Eppley et al. | 429/53 |

FOREIGN PATENT DOCUMENTS

| | | |
|---|---|---|
| 0 554 535 | 8/1993 | European Pat. Off. . |
| 1451530 | 9/1966 | France . |
| 2 315 773 | 1/1977 | France . |
| 806 301 | 6/1951 | Germany . |

*Primary Examiner*—Maria Nuzzolillo
*Assistant Examiner*—Monique M. Wills
*Attorney, Agent, or Firm*—Sughrue, Mion, Zinn Macpeak & Seas, PLLC

[57] ABSTRACT

The valve cap for an electric storage cell includes a central annular valve seat (23) and a membrane (5) fixed by its peripheral edge and urged against the seat by a piston (10) bearing thereagainst by means of a spring (12), the rear end of said spring (12) bearing on the endwall (8) of a chamber (20) formed in the cap and containing the piston (10) and the spring. A vent (19) puts the chamber (20) into communication with the atmosphere. A central orifice (26, 28) through the piston (10) and the membrane (5), enables gas from within the cell to escape via the top vent (19) when the valve opens.

2 Claims, 2 Drawing Sheets

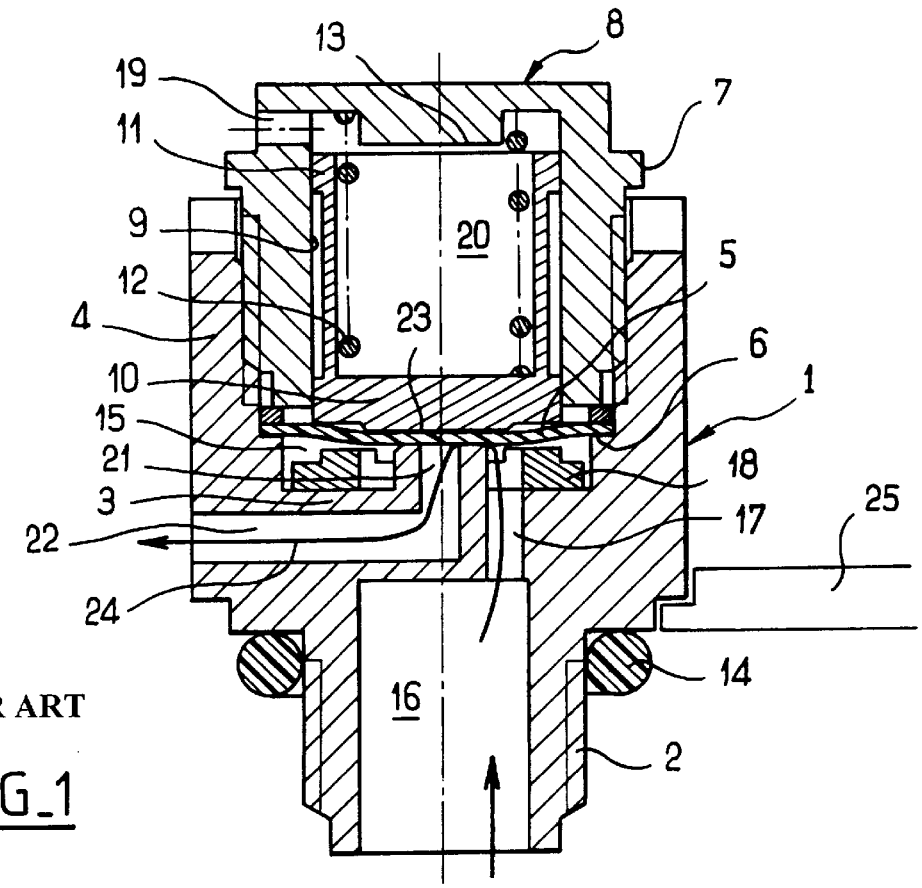
PRIOR ART
FIG_1
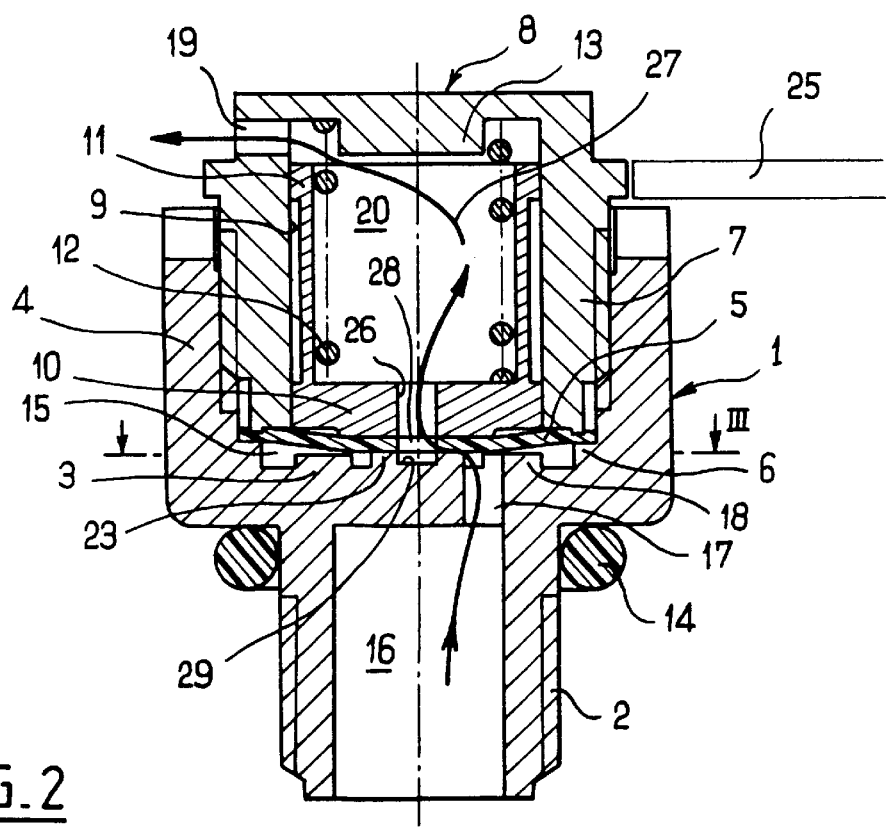
FIG_2

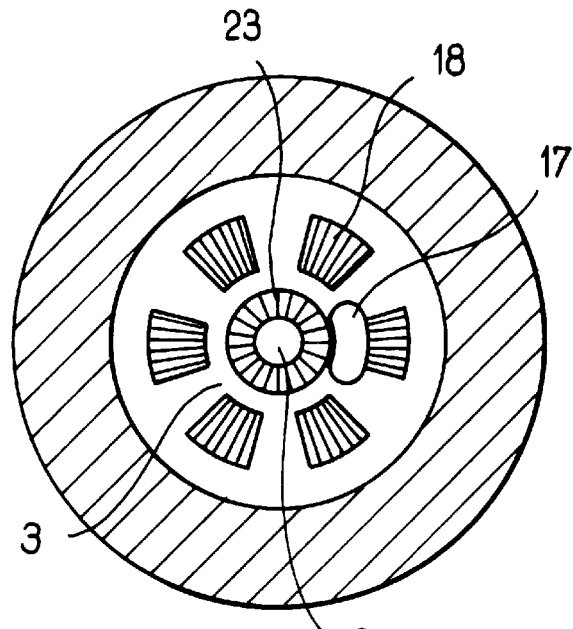
FIG_3
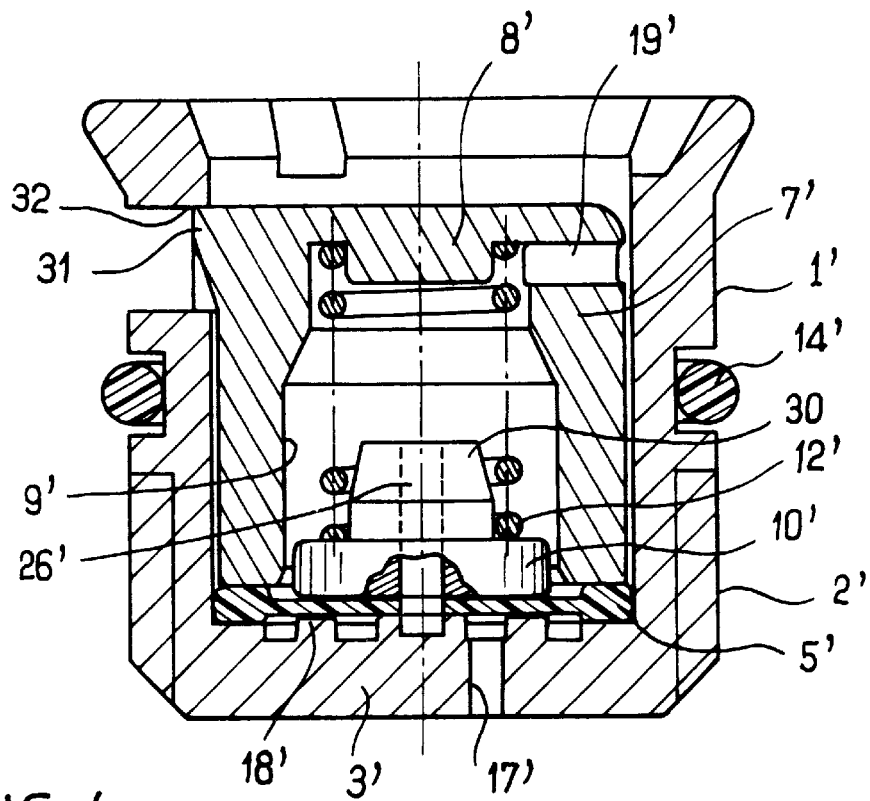
FIG_4

VALVE CAP FOR AN ELECTRIC STORAGE CELL

The present invention relates to a valve cap for an electric storage cell.

Many type of valves are known for storage cells.

In a conventional valve having a displaceable membrane, as shown in document FR-A-2 645 350 for example, a large amount of clearance exists between the piston and the seat in order to avoid any jamming, e.g. in the event of dust. Displacement of the piston is not perfectly axial: the piston does not always land exactly in the same place, resulting in a risk of leakage.

In a double-acting piston valve, as shown in document EP-A-0 504 573 for example, the upper piston rises in the event of excess internal pressure, allowing the gas to escape laterally. In the event of a drop in internal pressure, the lower piston descends and the outside gas penetrates via the central orifice of the upper piston. That amounts, in fact, to the combination of two "conventional" valves, which therefore present a risk of leakage.

Document US-A-5 388 615 shows a valve without a displaceable membrane which is adapted to small pressure variations, but which is not suitable for variations in relative pressure typically lying in the range 0.5 bars to about 3 bars, as envisaged in the present invention. Such variations do, however, come within the field of the valves without a displaceable membrane which are known from documents FR-A-1 451 530 and FR-A-2 315 773. Those documents teach a valve cap for an electric storage cell, said valve cap being designed to put the inside volume of a storage cell into communication with the atmosphere when the pressure in said volume exceeds a determined pressure greater than atmospheric pressure, said valve cap being of the type which comprises a body including a portion fitted in sealed but removable manner over an orifice of said storage cell, and including a central annular valve seat in communication with the atmosphere but normally closed by a closure part and an annular zone of a valve membrane having a much larger surface area than the section of the seat, and being fixed by its peripheral edge to said body, said membrane being urged in the seat-closing direction by the atmospheric pressure existing on one of its faces and by a piston bearing on said face by means of a spring calibrated as a function of the above-mentioned determined pressure, and being urged in the seat-opening direction by the pressure existing in the storage cell, and acting on at least a portion of the opposite face of said membrane, the rear end of said spring bearing on the endwall of a chamber formed in the body and containing the piston and said spring, a vent which puts said chamber into communication with the atmosphere being provided in said endwall or near to said endwall. Such valves, using a solid membrane and a spring, are robust and age well. However, in the known valve, the valve seat is constituted by the end of an axial duct formed in the base of the body and connected to the atmosphere via a transverse duct also provided in the base of the body. The valve seat is normally closed by a closure part constituted by the central portion of the membrane. Because of the presence of the transverse duct which opens out to the atmosphere in the vicinity of the base of the body, the known valve cap is essentially located above the lid of the storage-cell case and is therefore quite bulky.

The object of the invention is to reduce the bulkiness of the valve cap without known membrane displacement, and while conserving its advantages of robustness and long life.

This object is achieved in the context of a cap presenting the above-mentioned general configuration by the fact that instead of having ducts made in the bottom of the cap, the valve seat communicates with the atmosphere via an opening made in the piston and in the central portion of the membrane. The gas thus escapes, via said hole, to the upper portion of the valve. The valve is thus smaller and easier to make. It is intended, in particular, for electric vehicle batteries where the amount of space taken up by the battery is an important criterion.

Other characteristics and advantages of the invention appear from the following description, and with reference to the accompanying drawings, in which:

FIG. 1 is a longitudinal cross-section through a prior art valve cap;

FIG. 2 is a similar longitudinal cross-section through a first embodiment of a valve cap of the invention;

FIG. 3 is a cross-section along line III—III of FIG. 2; and

FIG. 4 is a similar longitudinal cross-section through a second embodiment of a valve cap of the invention.

FIG. 1 shows a prior art valve, known from document FR-A-1 451 530. It comprises a body 1 which is provided with a threaded tip 2 which is designed to be screwed into an orifice of the storage cell and sealed by means of an 0-ring 14. The body 1 includes an internal base 3 and cylindrical walls 4. A flexible membrane 5 is fixed by its peripheral border onto an inside shoulder 6 of the walls 4, where it is held by a stopper 7 bearing thereon. The stopper 7 is in the shape of an inverted goblet, having an endwall 8 (on top), and a cylindrical skirt 9 screwed into the wall 4. The inside of the stopper 7 forms a chamber 20 which, in its lower portion, contains a thrust piston 10 which bears on the membrane 5, said piston being secured to a guide 11 which slides inside the skirt 9 of the stopper 7, and receiving pressure from a compression spring 12 having a top end bearing on the endwall 8, and centered by a projection 13 from said endwall. A vent 19 provided near or in the endwall 8 of the stopper 7 puts the chamber 20 into communication with the atmosphere.

The other side of the membrane 5 defines a lower pressure chamber 15 via the base 3 and the bottom of the walls 4, which chamber communicates with the inside duct 16 of the threaded tip 2 via a passage 17 made through the base 3. Sector-shaped projections or bulges 18 (cf. also FIG. 3) are glued onto the surface of the base 3 and prevent the membrane 5 from sagging completely when the pressure within the storage cell is lower than atmospheric pressure.

Those elements are common to the present invention and are reproduced in FIG. 2 with the same reference numbers.

In the known valve cap, an axial duct 21 is provided in the base 3 of the body 1, said duct opening out into a transverse duct 22 open to the atmosphere. The upper annular edge of the axial duct 21 forms the valve seat 23 against which the membrane 5 bears. The valve is closed when the force exerted on the upper face of the membrane 5, resulting from the combination of atmospheric pressure and the pressure of the spring 12 bearing via the piston 10 on the rear face of the membrane 5, is greater than the force exerted on the lower face of the membrane, resulting from the pressure in the lower chamber 15 which is equal to the pressure within the storage cell. If, however, the second of these forces becomes greater than the first, then the membrane 5 rises and opens the valve on its seat 23; the excess gas can thus escape via the ducts 21 and 22 to the atmosphere, as indicated by arrow 24. Because the gas escapes level with the base 3, it is necessary for said level to be above the lid 25 of the storage cell case, as shown by the position of said lid, outlined on the righthand side only of the cap.

In the embodiment of the invention shown in FIG. 2, the annular projection 23 forming the valve seat is retained, but the ducts 21 and 22 are omitted (if starting with an existing part of the prior art, then said ducts can be plugged with resin). The valve is therefore closed on one side by the central portion 29 of the base 3 of the body. However, the membrane 5 is pierced through its center to form an orifice 28 of diameter smaller than the diameter 35 of the seat 23. The piston 10 is also pierced by a central passage 26. The diameter of the orifice 28 and the passage 26 is 0.9 mm, for example. When the pressure in the storage cell does not exceed the determined triggering pressure, the valve maintains the required sealing by abutting the membrane 5 against its valve seat 23. However, when the pressure in the storage cell exceeds said determined pressure, the excess gas escapes by following the path designated by arrow 27, passing successively through the passage 17, the chamber 15, the orifice 28, the passage 26, the chamber 20, and the top vent 19. As a result of this disposition, it is possible to place the lid 25 of the case in a high position relative to the cap, as shown in FIG. 2. In addition, it is possible to reduce the total height of the cap by several millimeters relative to the known cap because its base 3 can be thinner. It should be noted that the stopper 7 can be connected to the body 1 by screwing or by any other fixing means (gluing, welding, clipping). The body 1 can also be fixed in various ways onto the case of the storage cell (welding, clipping).

FIG. 4 shows a second embodiment of the invention incorporating several variants. Firstly, the general construction of the valve follows the teaching of document FR-A-2 315 773, namely that the valve stopper 7' is clipped inside the body 1' by means of teeth 31 (e.g. three teeth provided at the periphery of the endwall 8' of the stopper 7') which snap into corresponding recesses 32 formed in the top of the inside wall of the body 1'. Secondly, the piston 10' is no longer guided by the cylindrical walls 9' of the stopper 7', but is held axially by the spring itself 12', said spring having one end pressed against the projection from the endwall 8', and its other end pressed against a corresponding projection 30 provided on the back of the piston 101. The central passage 26' of the piston extends through said projection 30. Such a disposition of the piston having no contact enables friction and the problems associated with ingress of dust, moisture, or even ice (in the event of low temperature) to be eliminated. Here, the threading 2' is made on the body 1' itself. As for the rest, the characteristic of the invention can be seen, i.e. the evacuation route for excess gas to the atmosphere via passages 17', 26', and 19'.

We claim:

1. An electric storage cell comprising a valve cap designed to put the inside volume of the storage cell into communication with the atmosphere when the pressure in said volume exceeds a determined pressure greater than atmospheric pressure, said valve cap being of the type which comprises a body (1) including a portion (2) fitted in a sealed but removable manner over an orifice of said storage cell, and including, level with an inside base (3), a central annular valve seat (23) in communication with the atmosphere but closed by a closure part and an annular zone of a valve membrane (5) having a larger surface area than the section of the seat (23), and being fixed by its peripheral edge to said body, said membrane (5) being urged in the seat-closing direction by the atmospheric pressure existing on one of its faces, and by a piston (10) bearing on said one face by action of a spring (12) calibrated as a function of the said determined pressure, and being urged in the seat-opening direction by the pressure existing in the storage cell, and acting, via a passage (17) made in the inside base (3) of the body, on at least a portion of the opposite face of said membrane (5), the rear end of said spring (12) bearing on the endwall (8) of a chamber (20) formed in the body and containing the piston (10) and said spring (12), a vent (19) which puts said chamber (20) into communication with the atmosphere being provided in said endwall (8) or near to said endwall (8), characterized in that the valve seat (23) communicates with the atmosphere via an opening (26) made in the piston (10) and via an opening (28) made in the central portion of the membrane (5), the closure part being constituted by the central portion (29) of the inside base (3) of the body.

2. An electric storage cell according to claim 1, in which the inside base (3) of the body includes a central projection forming the valve seat (23), and sector-shaped projections (18).

* * * * *